United States Patent
Aswani et al.

(10) Patent No.: US 8,055,425 B2
(45) Date of Patent: Nov. 8, 2011

(54) INCREASED CAPABILITY MODULAR VEHICLE-DYNAMICS CONTROL ARCHITECTURE

(75) Inventors: Deepak Aswani, Westland, MI (US); Fazal Urrahman Syed, Canton, MI (US); Deepa Ramaswamy, Canton, MI (US); Anthony David Tsakiris, Beverly Hills, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 908 days.

(21) Appl. No.: 12/048,592

(22) Filed: Mar. 14, 2008

(65) Prior Publication Data
US 2009/0234551 A1 Sep. 17, 2009

(51) Int. Cl.
*G06F 7/00* (2006.01)
*G06F 17/00* (2006.01)
*B60K 6/00* (2007.10)
(52) U.S. Cl. ............... 701/84; 701/54; 701/70; 701/82; 477/7
(58) Field of Classification Search .............. 701/54, 701/69, 70, 71, 82, 84, 87; 477/7; 180/65.21
See application file for complete search history.

(56) References Cited

U.S. PATENT DOCUMENTS

| | | | |
|---|---|---|---|
| 5,390,117 A | 2/1995 | Graf et al. | |
| 6,862,511 B1 | 3/2005 | Phillips et al. | |
| 6,907,337 B2 | 6/2005 | Phillips et al. | |
| 7,090,613 B2 | 8/2006 | Heap et al. | |
| 7,154,236 B1 * | 12/2006 | Heap | 318/9 |
| 7,634,342 B2 * | 12/2009 | Post, II | 701/48 |
| 7,891,450 B2 * | 2/2011 | Soliman et al. | 180/65.265 |
| 2001/0016794 A1 | 8/2001 | Falck et al. | |
| 2003/0200016 A1 | 10/2003 | Spillane et al. | |
| 2004/0195017 A1 * | 10/2004 | Braun et al. | 180/65.2 |
| 2005/0004732 A1 | 1/2005 | Berry et al. | |
| 2005/0274553 A1 | 12/2005 | Salman et al. | |

* cited by examiner

*Primary Examiner* — Kevin Hurley
*Assistant Examiner* — Marc Scharich
(74) *Attorney, Agent, or Firm* — Brooks Kushman P.C.

(57) ABSTRACT

A system and method for controlling the amount of torque generated by at least one torque generating device in a vehicle is provided. A vehicle layer transmits arbitrated torque request signals indicative of first and second amounts of torque and at least one torque reservation request signal indicative of whether the vehicle is in an anticipated vehicle dynamic state or in a non-anticipated vehicle dynamic state. A coordination layer controls the torque generating device to generate the first amount of torque in response to the arbitrated torque request signal and the torque reservation request signal indicating that the vehicle is in the non-anticipated vehicle dynamic state. The coordination layer controls torque generating device to generate the second amount of torque in response to the arbitrated torque request signal and the torque reservation request signal indicating that the vehicle is in the anticipated vehicle dynamic state.

20 Claims, 4 Drawing Sheets

INCREASED CAPABILITY MODULAR VEHICLE-DYNAMICS CONTROL ARCHITECTURE

BACKGROUND

1. Technical Field

The embodiments described herein generally relate to a system and method for a vehicle-dynamics control architecture in hybrid electric vehicles (HEVs).

2. Background Art

Prior attempts at vehicle-dynamics control have tended to be modular in that a modular control approach allows for the reuse of controllers across various vehicles so that only calibration adjustments need to be made to each controller. The modular vehicle-dynamics control generally issues vehicle level fast wheel torque requests for vehicle-dynamics related systems. Such systems include an anti-locking braking system (ABS), traction control (TC) system, an electric stability control (ESC) system, an integrated vehicle-dynamics (IVD), etc. However, such requests are generated based on a prior knowledge of both system approximate wheel torque response dynamic capability (such as bandwidth or time constant) and the range of authority (positive and negative deltas). The approximated nature of the capabilities sometimes renders the vehicle-dynamics control less capable than physically possible, particularly for vehicles with multiple torque actuators having different dynamic capability and a range of authority with a time-varying split or distribution in use of the actuators.

Figure 1:
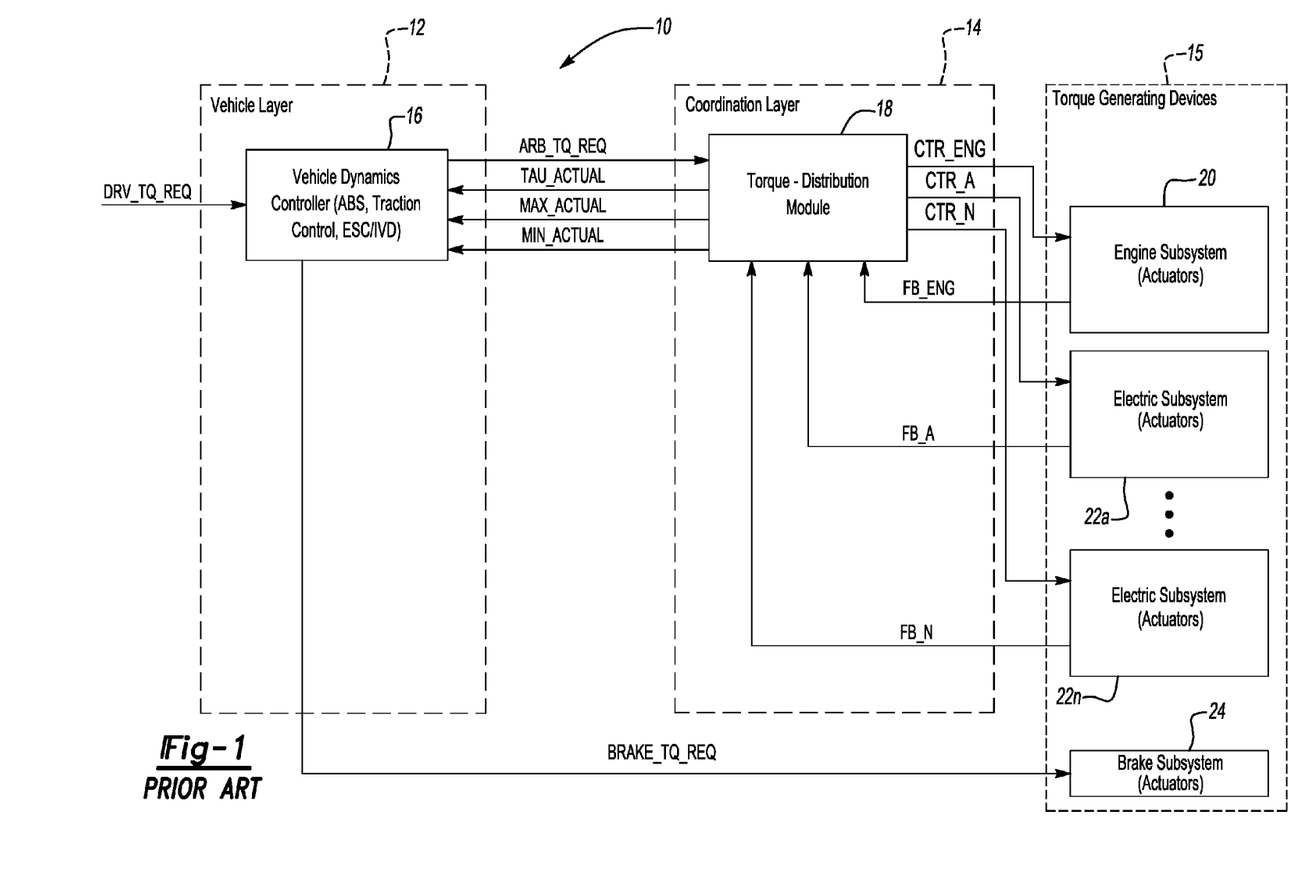
FIG. 1 depicts a conventional vehicle-dynamics control system focused on a modular approach.

FIG. 1 depicts a conventional vehicle-dynamics control system 10 that is based on the modular control approach. The system 10 includes a vehicle layer 12, a coordination layer 14 and a plurality of torque generating devices 15. The vehicle layer 12 contains functions related to the supervision of the control and coordination of all motions of the vehicle body. Such motions of the vehicle body may include all six degrees-of-freedom (DOF) of the vehicle body, as well as the sensing and interpreting of vehicle-related quantities. The central decision operating process of the vehicle-dynamic control resides in the vehicle layer 12. The central decision operating process determines the applicable amount of force that may have to be applied to the vehicle as a whole, in order to satisfy the overall intended behavior within physical limits. The coordination layer 14 contains coordinators that independently control and coordinate respective actuators within the torque generating devices 15. The task of the coordination layer 14 is to determine how wheel torque requests from the vehicle layer 12 are to be realized by the subsystems/actuators which belong to torque generating devices 15. The coordinator layer 14 may also provide feedback on the vehicle state to the driver.

The vehicle layer 12 receives a signal DRV_TQ_REQ. The signal DRV_TQ_REQ corresponds to an amount of torque that is needed to satisfy the amount of torque being requested by the driver as the driver operates the vehicle. The vehicle layer 12 includes a vehicle-dynamics controller (VDC) 16. The VDC 16 may be implemented as a standalone controller and generally controls various vehicle-dynamics attributes. Such attributes may include but are not limited attributes associated with an anti-locking brake system (ABS), traction control (TC) system, electronic stability control (ESC) (an integrated vehicle-dynamics IVD system) and a roll stability control (RSC) system. The ABS generally prevents the wheels from locking up as the vehicle undergoes a braking event. The TC system generally reduces power to drive wheels of the vehicle in order to minimize wheel-spin and maximize traction. The ESC or IVD system generally performs yaw stability control whereby the vehicle's motion of rotation about a vertical axis is controlled. The RSC system controls the motion of the vehicle by selectively applying brakes and adjusting the speed of the vehicle to prevent the vehicle from rolling over. The VDC 16 may be reused or implemented to support a plurality of vehicle lines and/or programs.

The coordination layer 14 includes a torque-distribution module 18. The coordination layer 14 generally corresponds to hardware characteristics that are specific to a single vehicle program. The torque-distribution module 18 may be configured to transmit/receive signals to/from the vehicle layer 12. The coordination layer 14 further controls various actuators within the torque generating devices 15. The torque generating devices 15 may be generally defined as any component, subsystem, and/or actuator in the vehicle that is adapted to generate torque, which contributes to vehicle traction torque. The torque generating devices 15 includes an engine subsystem 20, a plurality of electrical subsystems 22a-22n and a brake subsystem 24. The engine subsystem 20 generally includes an internal combustion engine of a HEV and one or more engine controllers. The engine controllers are adapted to control the operation of the engine and control the amount of torque generated by the engine. The electrical subsystems 22a-22n each generally include electrically based motors/generators (not shown) and motor/generator controllers for controlling the amount of torque generated by the motor/generator.

In general, the engine and the motor/generators may be defined as active torque actuators. An active torque actuator is indicative of a type of actuator that adds energy to the system. For example, the engine subsystem 20 adds energy by extracting the chemical potential energy in fuel. The electrical subsystems 22a-22n each add energy into the system 10 by extracting the chemical potential energy of the battery. A passive torque actuator such as the brake subsystem 24 is indicative of a type of actuator that may not add energy to the system. Such a passive actuator absorbs energy from the system. For example, friction brakes absorb kinetic energy from a system and convert kinetic energy into heat.

The VDC 16 is adapted to transmit a signal ARB_TQ_REQ to the torque-distribution module 18. The signal ARB_TQ_REQ generally corresponds to an arbitrated torque request that is based on the amount of torque desired by the driver and on the amount of torque requested by the various vehicle-dynamics systems in the vehicle. The VDC 16 is adapted to transmit a signal BRAKE_TQ_REQ to the brake subsystem 24. The signal BRAKE_TQ_REQ corresponds to a net wheel torque requested from the friction brakes which provides braking power beyond powertrain capability and with additional degrees of freedom or channels not conventionally available to powertrain braking (i.e., independent control of 4 wheels).

The torque-distribution module 18 transmits a plurality of control signals (e.g., CTR_ENG, and CTR_A-CTR_N) to the subsystems 20 and 22a-22n of the torque generating devices 15, respectively. The signal CTR_A generally corresponds to the amount of torque that is needed to be produced by the engine subsystem 20. The signals CTR_A-CTR_N generally correspond to the amount of torque that is needed to be produced by the electrical subsystems 22a-22n. The torque-distribution module 18 is configured to control the engine subsystem 20 and the electrical subsystems 22a-22n to produce the desired amount of torque as requested by the VDC 16 while balancing driver traction demand, battery charge maintenance, and fuel economy attributes. As such, the torque-distribution module 18 may vary the amount of torque generated between the engine subsystem 20 and the electrical subsystems 22a-22n in order to achieve desired driver traction demand, battery charge maintenance, and the highest level of fuel economy.

Due to concerns related to fuel economy, if needed, the torque-distribution module 18 may control the engine subsystem 20 to generate the entire amount of torque needed to meet the desired amount of torque as specified on the signal ARB_TQ_REQ. In such a case, the electrical subsystems 22a-22n may not be controlled to generate torque. Additionally, the torque-distribution module 18 may control one or more of the electrical subsystems 22a-22n to generate the entire amount of torque needed as indicated by the signal ARB_TQ_REQ. In such a case, the engine subsystem 20 may remain idle and is in a non-torque producing state. In yet another example, the torque-distribution module 18 may control the engine subsystem 20 and any one or more of the electrical subsystems 22a-22n to produce the desired amount of torque simultaneously if such a condition may yield optimal fuel economy while at the same time meet the desired amount of torque requested by the VDC 16.

The engine subsystem 20 transmits a feedback signal FB_ENG to the torque-distribution module 18. The signal FB_ENG may include a value (e.g., TAU_ENGINE) which generally corresponds to the actual response time of the engine subsystem 20 while attempting to achieve the desired amount of torque as indicated in the signal CTR_ENG from the torque-distribution module 18. The feedback signal FB_ENG also includes values MIN_TQ_ENG and MAX_TQ_ENG which correspond to minimum and maximum torque values, respectively, generated by the engine subsystem 20 in response to the signal CTR_ENG. The electrical subsystems 22a-22n are generally configured to transmit feedback signals FB_A-FB_N to the torque-distribution module 18. The signals FB-A-FB_N includes values TAU_ELEC_A-TAU_ELEC_N, respectively, which correspond to the actual response time for each electrical subsystem 22a-22n while attempting to achieve the desired amount of torque transmitted in the signal CTR_A-CTR_N from the torque-distribution module 18.

The feedback signals FB_A-FB_N also include values MIN_TQ_ELEC_A-MIN_TQ_ELEC_N and values MAX_TQ_ELEC_A-MAX_TQ_ELEC_N. The values MIN_TQ_ELEC_A-MIN_TQ_ELEC_N correspond to the minimum torque valve generated by each electrical subsystem 22a-22n in response to the signals CTR_A-CTR_N. The signals MAX_TQ_ELEC_A-MAX_TQ_ELEC_N correspond to the maximum torque values generated by each electrical subsystem 22a-22n in response to the signals CTR_A-CTR_N.

In general, the engine subsystem 20 and the electrical subsystems 22a-22n are constructed with various limitations and may generate torque that is within a first predetermined range of the amount of torque requested by the VDC 16. Such limitations may be attributed due to hardware capabilities of the engine and electrical subsystems 20 and 22a-22n. Typically, the torque capability of the engine subsystem 20 and the electrical subsystems 22a-22n are a function of battery voltage, state of charge of the battery and/or various torque actuator speed states (e.g., actuators in the engine and electrical subsystems 20 and 22a-22n). The torque, battery voltage, state of charge, and the actuator speed status may prevent the engine and the electrical subsystems 20 and 22a-22n from generating the needed amount of torque as requested by the VDC 16.

The engine subsystem 20 transmits the values MIN_TQ_ENG and MAX_TQ_ENG to the torque-distribution module 18 via the signal FB_ENG. The electrical subsystems 22a-22n transmits the values MIN_TQ_ELEC_A-MIN_TQ_ELEC_N and the signals MAX_TQ_ELEC_A-MAX_TQ_ELEC_N via the signals FB_A-FB_N to the torque-distribution module 18. The torque-distribution module 18 transmits a signal TAU_ACTUAL, a signal MIN_ACTUAL and a signal MAX_ACTUAL to the VDC 16.

In general, the signals TAU_ACTUAL, MIN_ACTUAL, and MAX_ACTUAL provide actual information of the response time to reach the minimum and maximum torque, the minimum torque amount, and the maximum torque amount, respectively, that is established with the torque generating devices 15. In some cases, the torque generating devices 15 may not achieve the desired torque amount as requested by the VDC 16. The VDC 16 uses the signals TAU_ACTUAL, MIN_ACTUAL, and MAX_ACTUAL as feedback signals to modify the desired torque amount (e.g., signal ARB_TQ_REQ) based on new desired torque level commands that may be necessitated due to torque requirements established by the driver and/or the vehicle-dynamics systems of the vehicle.

The system 10 generally provides for a modular focused control architecture which lends itself for providing a common implementation for a number of different vehicle applications. The engine subsystem 20 generally provides for a slower response time in generating torque than the response time of the electrical subsystems 22a-22n. The desired amount of torque needed for the vehicle-dynamics capability of the system 10 is generally limited to the response of the slowest torque actuator which in this case may be the engine subsystem 20. Such a characteristic provides for a limitation in performing vehicle-dynamics control.

SUMMARY

A system and method for controlling the amount of torque generated by at least one torque generating device in a vehicle is provided. A vehicle layer transmits arbitrated torque request signals indicative of first and second amounts of torque desired by at least one of a driver and a vehicle-dynamic system and at least one torque reservation request signal indicative of whether the vehicle is in an anticipated vehicle dynamic state or in a non-anticipated vehicle dynamic state. A coordination layer controls the torque generating device to generate the first amount of torque in response to the arbitrated torque request signal and the torque reservation request signal indicating that the vehicle is in the non-anticipated vehicle dynamic state. The coordination layer controls the torque generating device to generate the second amount of torque in response to the arbitrated torque request signal and the torque reservation request signal indicating that the vehicle is in the anticipated vehicle dynamic state.

DETAILED DESCRIPTION OF THE PREFERRED EMBODIMENT(S)

Figure 2:
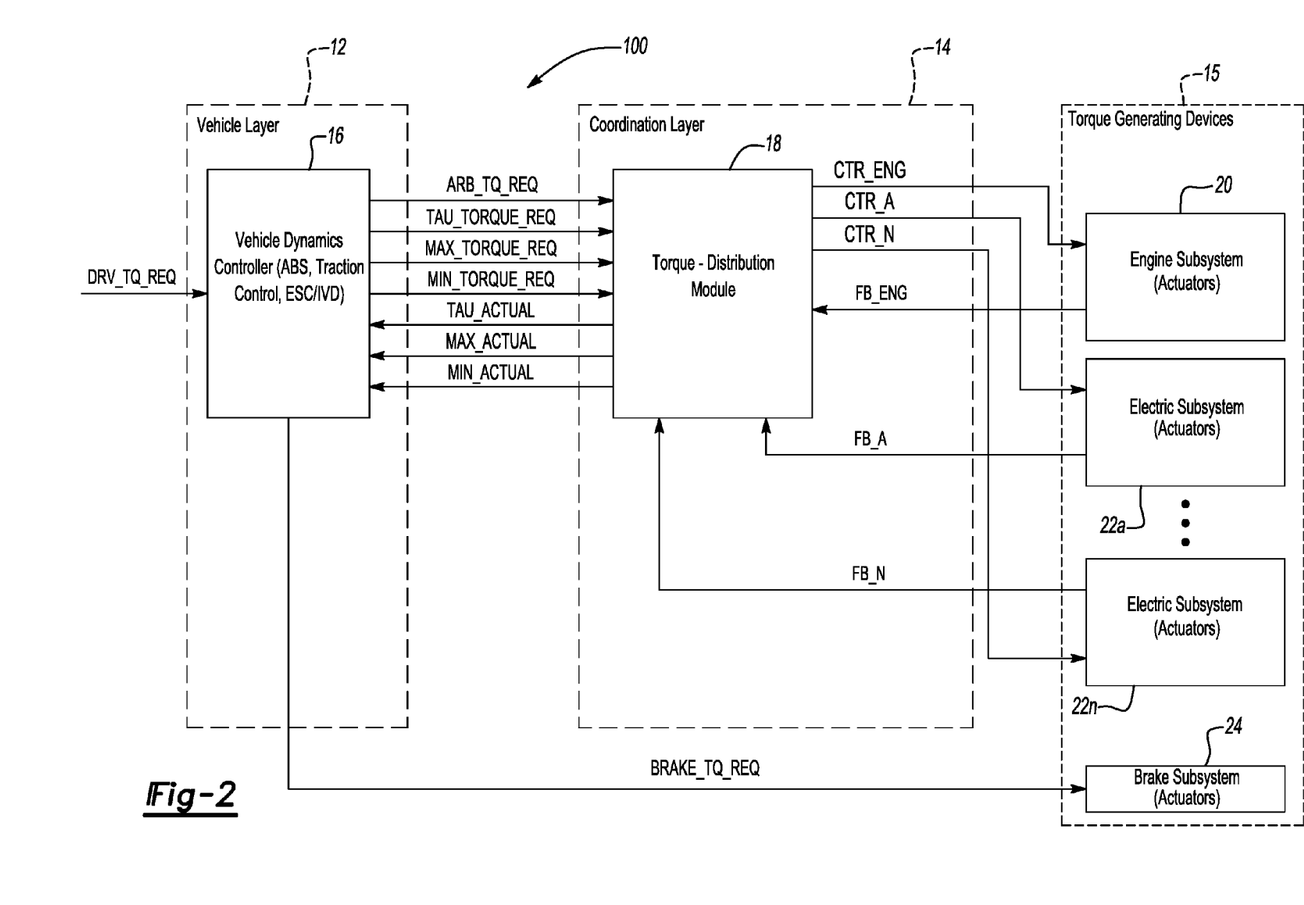
FIG. 2 depicts a vehicle-dynamics control system in accordance to one embodiment of the present invention.

FIG. 2 depicts a vehicle-dynamics control system 100 in accordance to one embodiment of the present invention. The VDC 16 transmits a plurality of fast torque reservation request signals (e.g., signals TAU_TORQUE_REQ, MAX_TORQUE_REQ, and MIN_TORQUE_REQ) to the torque-distribution module 18. In general, the system 100 distributes torque commands among the various torque actuators (e.g., in the engine 20 and electrical subsystems 22a-22n) to meet base attributes such as traction torque demand, fuel economy, and battery charge maintenance while attempting to achieve the desired amount of torque as indicated on the signal ARB_TQ_REQ. The system 100 is configured to reserve the faster torque actuators within the torque generating devices 15 to provide for faster torque generation in the event that a vehicle-dynamics event is anticipated.

Given that vehicle-dynamics stabilization constitutes the highest priority event due to safety implications (e.g., ABS, TC, ESC, RSC), utilization of the faster torque actuators serves as a constraint to the base attributes such as the brake subsystem 24. The reserved torque actuators may continue to generate torque even if a vehicle-dynamics event is not anticipated. If a vehicle-dynamics event is not anticipated, typically the driver wheel torque demand and fuel economy attributes are balanced using the set of torque actuators, which may permit use of even the reserved torque actuators. In such a case where a vehicle dynamics event is not anticipated, the system 100 while still utilizing the faster torque actuators to produce torque to meet the torque requirements set forth in the signal ARB_TQ_REQ may limit the operation of the faster torque actuators and request for increased torque production from the faster torque actuators once a vehicle dynamic event is anticipated. The torque-distribution module 18 monitors the torque reservation request signals (e.g., the signals TAU_TORQUE-REQ, MAX_TORQUE-REQ, and MIN_TORQUE_REQ) to determine if the vehicle is in an anticipated vehicle dynamic state. Such a characteristic will be discussed in more detail in connection with FIGS. 3a-3b.

The vehicle layer 12 may request for a specific time response for the faster torque actuators to generate torque (of the engine subsystem 20 and/or the electrical subsystems 22a-22n) with the signal TAU_TORQUE_REQ. The vehicle layer 12 may also generate a command to utilize the faster torque actuators in the torque generating devices 15 to increase the amount of torque that is produced. The signal MAX_TORQUE_REQ and the vehicle layer 12 may also generate a command to utilize the torque actuator in the torque generating devices 15 to decrease the amount of torque that is produced with the signal MIN_TORQUE_REQ. The signals MAX_TORQUE_REQ and MIN_TORQUE_REQ are indicative of maximum and minimum absolute torques, respectively, that are capable of satisfying the time response request indicated by TAU_TORQUE_REQ.

The torque-distribution module 18 controls the engine subsystem 20 and/or the electrical subsystems 22a-22n to produce the amount of torque needed to support the anticipated vehicle-dynamics event with the signals CTR_ENG and CTR_A-CTR_N in response to receiving the torque reservation request signals (e.g., signals TAU_TORQUE_REQ, MAX_TORQUE_REQ, MIN_TORQUE_REQ). The torque-distribution module 18 controls at least one of the torque generating devices 15 to operate at a midpoint (or within a predetermined torque generating range) such that the torque generating devices 15 are capable of providing an increase in torque in response to the signal MAX_TORQU-E_REQ or a decrease in torque in response to the signal MIN_TORQUE_REQ within a desired time response indicated by the signal TAU_TORQUE_REQ. If a vehicle-dynamics event is not anticipated, the torque reservation request signals may generally default to a nominal value. The nominal value may be offset from the desired amount of torque as indicated in the signal ARB_TQ_REQ. If a vehicle-dynamics event is anticipated, the vehicle layer 12 may command the coordination layer 14 to reserve torque generation via the signals MAX_TORQUE_REQ and MIN_TORQUE_REQ within the reserved time response specified via the signal TAU_TORQUE_REQ based on a detected road surface coefficient of friction (mu), detected wheel slip, and/or the recent history of the vehicle-dynamics event being triggered. In general, the VDC 16 transmits the signal ARB_TQ_REQ which is used to indicate the desired amount of torque that is needed to be produced by active subsystems such as the engine subsystem 20 and the electrical subsystems 22a-22n.

Figure 3A:
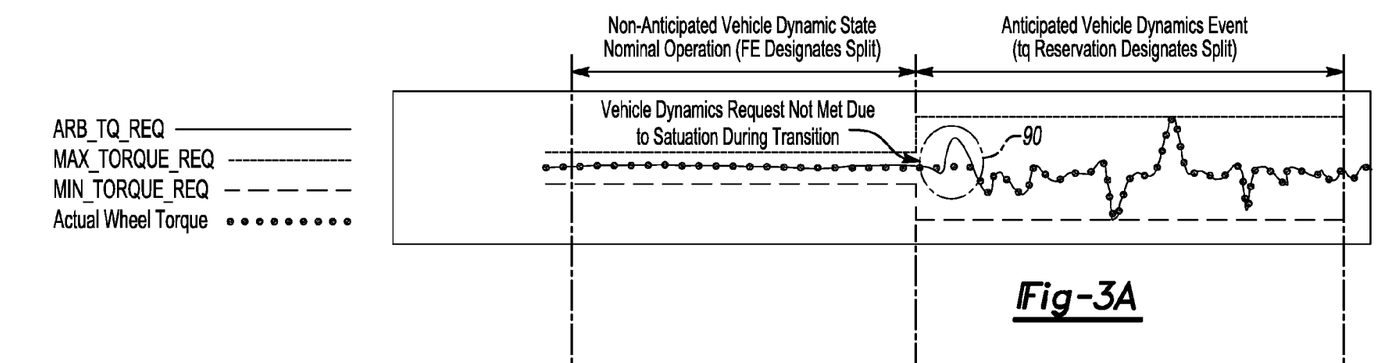
FIGS. 3a-3b depict plots of the torque reservation request signals when in a non-anticipated vehicle dynamic state and in an anticipated vehicle dynamic state.
Figure 3B:
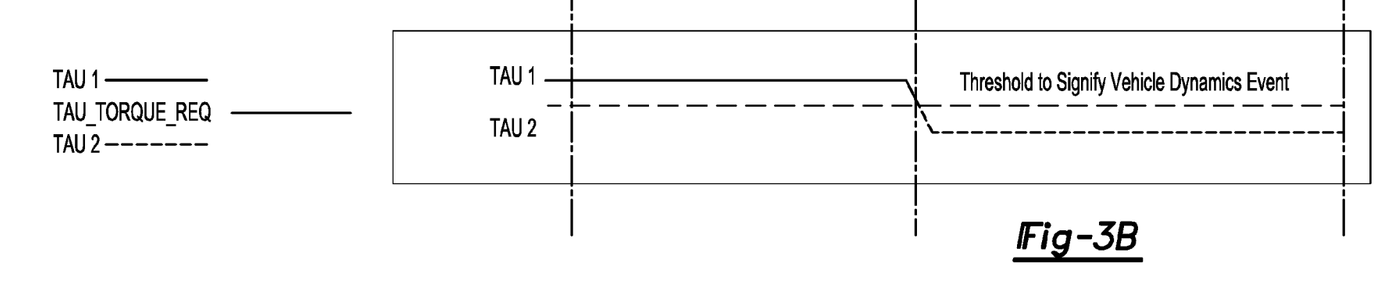

FIGS. 3a-3b depict plots of the torque reservation request signals when the vehicle is in a non-anticipated vehicle dynamic state and in an anticipated vehicle dynamic state. FIGS. 3a and 3b illustrate that in the non-anticipated vehicle dynamic state, the signals MAX_TORQUE_REQ, MIN_TORQUE_REQ and TAU_TORQUE_REQ generally remain constant. In the event the torque-distribution module 18 detects that any one or more of the torque reservation request signals (e.g., signals MAX_TORQUE_REQ, MIN_TORQUE_REQ and TAU_TORQUE_REQ) exceed predetermined thresholds, such a condition is generally indicative of the vehicle being in an anticipated vehicle dynamic state. As shown in FIG. 3a, in the anticipated vehicle dynamic state, the signal MAX_TORQUE_REQ increases which corresponds to an increased amount of torque that is needed to be generated in accordance to the signal ARB_TQ_REQ and the signal MIN_TORQUE_REQ decreases which corresponds to a decreased amount of torque that is needed to be generated in accordance to the signal ARB_TQ_REQ. The torque generating devices 15 are generally configured to operate at a midpoint to provide either an increase in torque or a decrease in torque in order to avoid saturation. For example, in the event an increased amount of torque is needed, any one or more of the electric motor subsystems 22a-22n increase torque production while gradually decreasing down (or decaying down) to the midpoint or at some predetermined operation level to avoid becoming saturated.

In yet another example, in the event a decreased amount of torque is needed, any one or more of the electric motor subsystems 22a-22n decrease torque production while ramping up toward a midpoint or at some predetermined operation level to avoid becoming saturated. In general, saturation may correspond to a state in which any one or more of the torque generating devices 15 are operating at a full capacity whereby the torque generating devices 15 are generating the maximum amount of torque that is capable of being produced. Saturation may also correspond to a state in which any one or more of the torque generating devices 15 are not producing torque. It is generally desirable to control the torque generating devices 15 such that the torque generating devices 15 operate at a midpoint in order to meet expected response times as indicated by the signal TAU_TORQUE_REQ.

A point 90 as shown in FIG. 3a generally corresponds to a saturation point in which one or more of the torque generating devices 15 are not capable of generating the needed amount of torque in accordance to the amount of torque indicated by the signal ARB_TQ_REQ. FIG. 3b illustrates the state of the signal TAU_TORQUE_REQ when the vehicle is in a non-anticipated vehicle dynamic state and when the vehicle is in an anticipated vehicle dynamic state. The signal MAX_TORQUE_REQ generally corresponds to a maximum torque limit that may be produced by the torque generating devices 15. The signal MIN_TORQUE_REQ corresponds to a minimum torque limit that may be produced by the torque generating devices 15. The actual amount of torque needed to be produced by the torque generating devices 15 while the vehicle is in the anticipated vehicle dynamic state is generally indicated by the signal ARB_TR_REQ. The signal MAX_TORQUE_REQ and MIN_TORQUE_REQ provide upper and lower torque limits for the torque generating devices 15.

Figure 4:
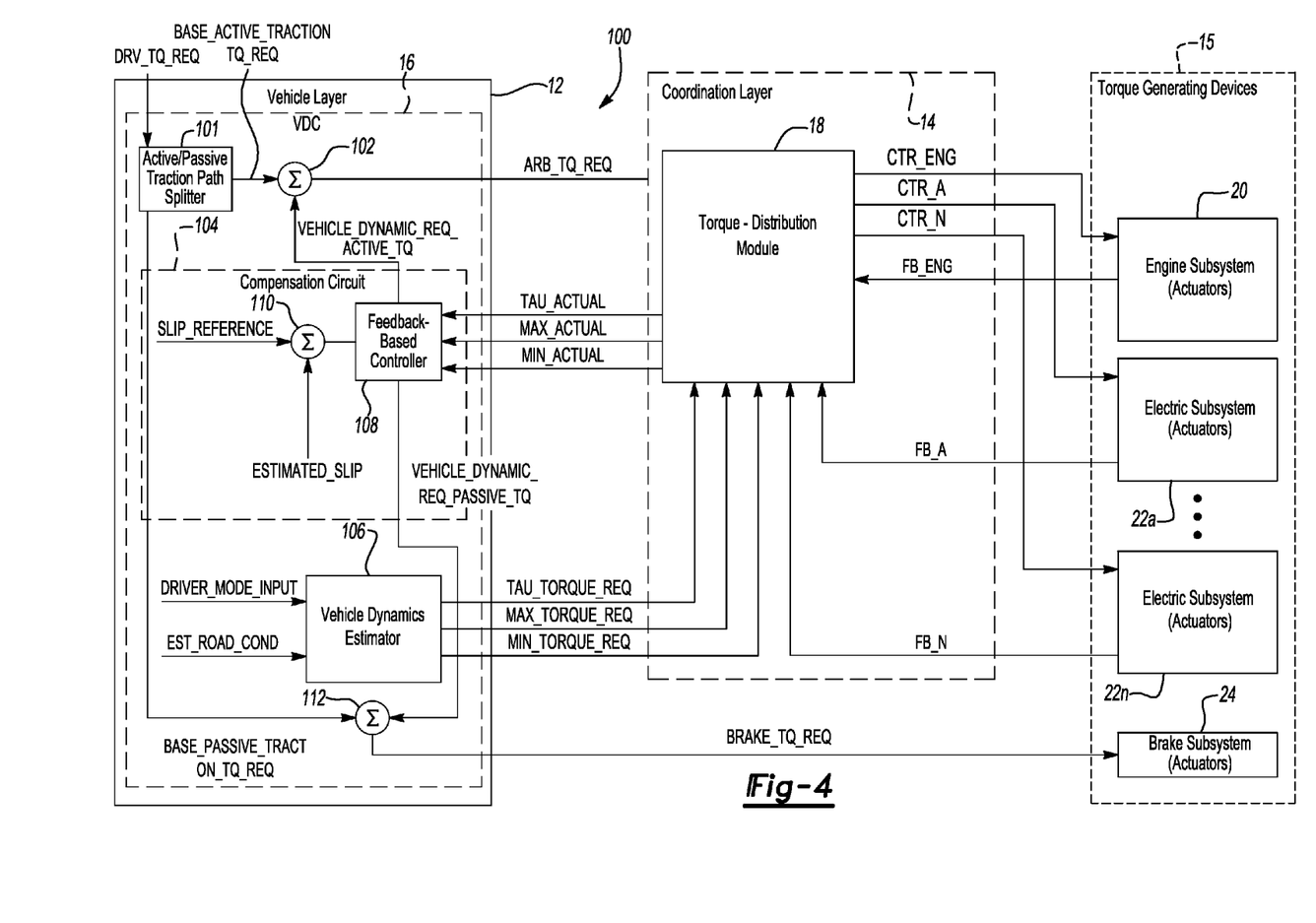
FIG. 4 depicts a more detailed view of the vehicle-dynamics control system of FIG. 2.

FIG. 4 depicts a more detailed view of the vehicle-dynamics control system 100. The VDC 16 generally includes an active/passive traction path splitter circuit 101, an adder circuit 102, a vehicle-dynamics compensation circuit 104 and a vehicle-dynamics estimator 106. The active/passive traction path splitter circuit 101 generates a signal BASE_ACTIVE_TQ_REQ and a signal BASE_PASSIVE_TQ_REQ. In general, the sum of the signals BASE_ACTIVE_TQ_REQ and BASE_PASSIVE_TQ_REQ reflect the net driver requested vehicle propulsion torque at the wheels. The signal BASE_ACTIVE_TQ_REQ is achieved by utilizing the active torque actuators within the engine and electric electrical subsystems 20 and 22a-22n, while the signal BASE_PASSIVE_TQ_REQ is achieved by utilizing passive torque actuators in the brake subsystem 24 such as the friction brakes. In a conventional, non-hybrid vehicle, the signal BASE_ACTIVE_TQ_REQ reflects the accelerator pedal-based wheel torque request and the signal BASE_PASSIVE_TQ_REQ reflects the brake pedal-based wheel torque request. In a hybrid electric vehicle, the signal BASE_ACTIVE_TQ_REQ reflects the accelerator pedal-based wheel torque request plus regenerative braking wheel torque request, while the signal BASE_PASSIVE_TQ_REQ reflects the brake pedal-based wheel torque request minus regenerative braking wheel torque request.

The compensation circuit 104 includes a feedback-based controller 108 and a subtractor circuit 110. The subtractor circuit 110 is adapted to receive a signal SLIP_REFERENCE and a signal ESTIMATED_SLIP. In general, the signal SLIP_REFERENCE is based on a predetermined threshold for tires of the vehicle. The signal SLIP_REFERENCE corresponds to a value that is indicative of vehicle tires being applied to a nominal range of surfaces which is intended to make friction force in contact with the road more consistent. Past a certain slip threshold, the friction force that is in contact with the road drops off. The signal SLIP_REFERENCE corresponds to a value that is representative of somewhere in between no slip and the friction drop-off where traction is lost.

The signal ESTIMATED_SLIP is an amount of tire slip that is determined by estimated wheel torque and measured individual wheel speeds. The subtractor circuit 110 subtracts the signal ESTIMATED_SLIP from the signal SLIP_REFERENCE and transmits the difference to the feedback-based controller 108. The feedback-based controller 108 also receives the signals TAU_ACTUAL, MIN_ACTUAL, and MAX_ACTUAL for gain-scheduling purposes and generates a signal VEH_DYNAMIC_REQ_PASSIVE_TQ. The signal VEH_DYNAMIC_REQ_PASSIVE_TQ corresponds to the torque modulation applied to the brakes by a vehicle dynamics module such as the anti-lock brake system during a vehicle dynamics event. The feedback-based controller 108 is activated when the signal ESTIMATED_SLIP exceeds a predefined calibrated threshold that is related to the vehicle-dynamics functions (e.g., ABS, TC, ESC, and/or IVD). The feedback-based controller 108 generates a signal VEH_DYNAMIC_REQ_ACTIVE_TQ which corresponds to additional wheel torque to ensure that the wheel slip may not exceed the signal SLIP_REFERENCE. The signal VEH_DYNAMIC_REQ_ACTIVE_TQ corresponds to the amount of torque that is needed for a particular vehicle-dynamics function (e.g., TC, ESC, and/or IVD). The adder circuit 102 receives the signals BASE_ACTIVE_TRACTION_TQ_REQ and VEH_DYNAMIC_REQ_ACTIVE_TQ to generate the signal ARB_ACTIVE_TRACTION_TQ_REQ.

The active/passive traction path splitter 101 generates a signal BASE_PASSIVE_TRACTION_TQ_REQ which corresponds to the amount of torque needed for ABS. An adder circuit 112 receives the signal BASE_PASSIVE_TRACTION_TQ_REQ and the signal VEHICLE_DYNAMIC_REQ_PASSIVE_TQ to generate the signal BRAKE_TQ_REQ. The signal BRAKE_TQ_REQ includes both the signal BASE_ACTIVE_TRACTION_TQ_REQ and the signal VEHICLE_DYNAMIC_REQ_PASSIVE_TQ. The signal BASE_ACTIVE_TRACTION_TQ_REQ is determined in the vehicle layer for multiple torque source systems such as hybrid electric vehicles. The signal BASE_ACTIVE_TRACTION_TQ_REQ is analogous to the wheel brake torque requested by applying the brake pedal in a conventional non-hybrid electric vehicle. The signal VEHICLE_DYNAMIC_REQ_PASSIVE_TQ corresponds to brake torque modulation that is applied by a module such as the anti-lock brake controller in the channels or degrees of freedom designated to that particular module.

The vehicle-dynamics estimator 106 is generally configured to determine the amount of reserved torque that may be needed based on an anticipated vehicle-dynamics event. The reserved amount of torque may be achieved by reserving torque production with the fastest torque actuators within the torque generating devices 15. As noted above, the reserved torque actuators may be generating torque even if a vehicle-dynamics event is not anticipated. If a vehicle-dynamics event is not anticipated, typically the driver wheel torque demand and fuel economy attributes are balanced using reserved and non-reserved torque actuators. Use of the reserved torque actuators may be limited in an application when the signal BASE_ACTIVE_TRACTION_TQ_REQ is large such that the reserved torque actuators are less likely to saturate in the event the reserved torque actuators are called upon to generate the additional torque within a faster response time based on any anticipated vehicle dynamic event.

A signal DRIVER_MODE_INPUT is presented to the vehicle-dynamics estimator 106. The signal DRIVER_MODE_INPUT generally corresponds to the mode of operation sought by the driver from the vehicle. For example, some vehicles may include switches to enable off-road modes, snow modes, ice modes, gravel mode, sand mode, and other such terrain based modes which may indicate the torque reserve and torque response expectations. A signal EST_ROAD_COND is presented to the vehicle-dynamics estimator 106. The signal EST_ROAD_COND generally corresponds to expected road conditions that the vehicle may encounter based on a driving history of estimated wheel torque and the measured slip at the individual wheels. The signal EST_ROAD_COND includes information such as road contact friction coefficient (e.g., mu) and potentially loose road material such as gravel or snow. The expected road conditions may be based on driving history and may also indicate reserving the amount of torque that is to be produced (via the signals MAX_TORQUE_REQ and MIN_TORQUE_REQ) and torque response expectations (e.g., time response of producing increased amounts of torque or decreased amounts of torque via the signal TAU_TORQUE_REQ).

In general, the system 100 allows for a modular structure while maintaining the ability to take advantage of faster actuators in the torque generating devices 15 to quickly and accurately achieve the arbitrated traction torque request (e.g., slow, driver pedal based request) when anticipating a vehicle-dynamics event. For example, if a vehicle-dynamics event is anticipated, the vehicle layer 12 can command a fast actuation range of authority at the wheels and a dynamic capability request with the signals MAX_TORQUE_REQ and MIN_TORQUE_REQ and also a dynamic capability request (or desired time response) with the signal TAU_TORQUE_REQ to generate the additional amount of torque needed based on an anticipated vehicle-dynamics event.

The torque-distribution module 18 acts in the same manner as described in FIG. 2. The torque-distribution module 18 controls the engine subsystem 20 and/or the electrical subsystems 22a-22n to reserve the amount of torque needed to support the anticipated vehicle-dynamics event with the signals CTR_ENG and CTR_A-CTR_N in response to receiving the torque reservation request signals (e.g., signals TAU_TORQUE_REQ, MAX_TORQUE_REQ, MIN_TORQUE_REQ). The torque-distribution module 18 controls at least one of the torque generating devices 15, to operate at a midpoint such that the torque generating devices 15 are available to provide either an increase in torque potentially up to the amount of torque set by the signal MAX_TORQUE_REQ or a decrease in torque potentially down to the amount of torque defined by the signal MIN_TORQUE_REQ, within a desired response time indicated by the signal TAU_TORQUE_REQ relative to the signal ARB_TQ_REQ. If a vehicle-dynamics event is not anticipated, the torque reservation request signals may generally default to a nominal value. The nominal value may be offset from the desired amount of torque as indicated in the signal ARB_TQ_REQ. If a vehicle-dynamics event is anticipated, the vehicle layer 12 may command the coordination layer 14 to reserve the torque via the signals MAX_TORQUE_REQ and MIN_TORQUE_REQ within the reserved time response specified via the signal TAU_TORQUE_REQ. In general, the VDC 16 transmits the signal ARB_TQ_REQ which is used to indicate the desired amount of torque that is needed to be produced by active subsystems such as the engine subsystem 20 and the electrical subsystems 22a-22n.

The anticipation of a vehicle-dynamics event may be realized via two methods. In a first method, the driver may manually select a terrain mode where, for example, in an "ice" mode additional fast torque generation may be achieved by controlling the fastest torque actuators within the engine subsystem 20 and the electrical subsystems 22a-22n with the torque reservation request signals to generate the additional amount of torque with a faster response time to accommodate the low friction coefficient or mu surface properties where wheel slip is easy to achieve. Alternatively, in a manual terrain mode (e.g., an "asphalt" mode), the system 100 may generate torque at a slower time response than that of the ice mode by controlling slower actuators between the engine subsystem 20 and the electrical subsystems 22a-22n with the signal ARB_TQ_REQ to allow for more liberal use of the torque actuators. The second method of the anticipated vehicle-dynamics event may be an adaptive judgment of the expected fast wheel torque reserve needs. One way to determine the adaptive judgment may be based on recent history of vehicle-dynamics events. For example, a certain threshold of the quantity and the nature of traction control events based on past history, may trigger the utilization of faster torque actuators within the torque generating devices 15 by reserving sufficient amount of torque reserve for generation by the faster torque actuators, greater vehicle capability in terms of vehicle-dynamics stabilization during wheel slip events may be provided.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for controlling an amount of torque generated by at least one torque generating device in a vehicle, the system comprising:
   a vehicle layer configured to transmit at least one arbitrated torque request signal indicative of first and second amounts of torque desired by at least one of a driver and a vehicle-dynamic system and at least one torque reservation request signal indicative of whether the vehicle is in at least one of an anticipated vehicle dynamic state and a non-anticipated vehicle dynamic state; and
   a coordination layer configured to:
      control the at least one torque generating device to generate the first amount of torque in response to the at least one arbitrated torque request signal and the at least one torque reservation request signal indicating that the vehicle is in the non-anticipated vehicle dynamic state; and
      control the at least one torque generating device to generate the second amount of torque in response to the at least one arbitrated torque request signal and the at least one torque reservation request signal indicating that the vehicle is in the anticipated vehicle dynamic state,
   wherein the coordination layer controls the at least one torque generating device to operate at a predetermined operation level to generate the second amount of torque.

2. The system of claim 1 wherein the predetermined operation level corresponds to the at least one torque generating device operating at a fifty percent operation level while generating the second amount of torque to prevent the at least one torque generating device from entering into a saturated state.

3. The system of claim 1 wherein the at least one torque reservation request signal includes a maximum torque signal indicative of a maximum amount of torque that is capable of being produced while the vehicle is in the anticipated vehicle dynamic state.

4. The system of claim 1 wherein the at least one torque reservation request signal includes a minimum torque signal indicative of a minimum amount of torque that is capable of being produced while the vehicle is in the anticipated vehicle dynamic state.

5. The system of claim 1 wherein the at least one torque reservation request signal includes a time response signal indicative of a response time for generating the second amount of torque while the vehicle is in the anticipated vehicle dynamic state.

6. The system of claim 1 wherein the torque reservation request signal is based on estimated road conditions.

7. The system of claim 6 wherein the estimated road conditions are based on a driving history of estimated wheel torque and a measured amount of wheel slip at each individual wheel.

8. The system of claim 7 wherein the estimated road conditions are further based on road contact friction coefficient information.

9. The system of claim 1 wherein the at least one torque reservation request signal is based on driver mode inputs.

10. The system of claim 1 wherein the at least one torque reservation request signal includes at least one of a maximum torque request signal, a minimum torque request signal, and a time response signal, and wherein the coordination layer is configured to monitor the at least one of the maximum torque request signal, the minimum torque request signal, and the time response signal to determine if the vehicle is in the at least one of an anticipated vehicle dynamic state and a non-anticipated vehicle dynamic state.

11. A method for controlling an amount of torque generated by at least one torque generating device in a vehicle, the method comprising:
receiving at least one arbitrated torque request signal indicative of first and second amounts of torque desired by at least one of a driver and a vehicle-dynamic system;
receiving at least one torque reservation request signal indicative of whether the vehicle is in at least one of an anticipated vehicle dynamic state and a non-anticipated vehicle dynamic state;
controlling the at least one torque generating device to generate the first amount of torque in response to the at least one arbitrated torque request signal and the at least one torque reservation request signal indicating that the vehicle is in the non-anticipated vehicle dynamic state; and
controlling the at least one torque generating device to generate the second amount of torque in response to the at least one arbitrated torque request signal and the at least one torque reservation request signal indicating that the vehicle is in the anticipated vehicle dynamic state,
wherein the at least one torque generating device is controlled to operate at a predetermined operation level to generate the second amount of torque.

12. The method of claim 11 wherein the at least one torque reservation request signal includes a maximum torque signal indicative of a maximum amount of torque that is capable of being produced while the vehicle is in the anticipated vehicle dynamic state.

13. The method of claim 11 wherein the at least one torque reservation request signal includes a minimum torque signal indicative of a minimum amount of torque that is capable of being produced while the vehicle is in the anticipated vehicle dynamic state.

14. The method of claim 11 wherein the at least one torque reservation request signal includes a time response signal indicative of a response time for generating the second amount of torque while the vehicle is in the anticipated vehicle dynamic state.

15. The method of claim 11 wherein the predetermined operation level corresponds to the at least one torque generating device operating at a fifty percent operation level while generating the second amount of torque to prevent the at least one torque generating device from entering into a saturated state.

16. The method of claim 11 wherein the at least one torque reservation request signal includes at least one of a maximum torque request signal, a minimum torque request signal, and a time response signal; and further monitoring the at least one of the maximum torque request signal, the minimum torque request signal, and the time response signal to determine if the vehicle is in the at least one of an anticipated vehicle dynamic state and a non-anticipated vehicle dynamic state.

17. The method of claim 11 wherein the at least one torque reservation request signal is based on estimated road conditions.

18. The method of claim 17 wherein the estimated road conditions are based on a driving history of estimated wheel torque and a measured amount of wheel slip at each individual wheel.

19. The method of claim 18 wherein the at least one torque reservation request signal is based on driver mode inputs.

20. A system for controlling an amount of torque generated by at least one torque generating device in a vehicle, the system comprising:
a vehicle layer configured to transmit at least one arbitrated torque request signal indicative of a first amount of torque and a second amount of torque desired by at least one of a driver and a vehicle-dynamic system and at least one torque reservation request signal indicative of whether the vehicle is in at least one of an anticipated vehicle dynamic state and a non-anticipated vehicle dynamic state, and
a coordination layer configured to:
control the at least one torque generating device to generate the first amount of torque within a first predetermined response time in response to the at least one arbitrated torque request signal and the at least one torque reservation request signal indicating that the vehicle is in the non-anticipated vehicle dynamic state; and
control the at least one torque generating device to generate the second amount of torque within a second predetermined response time in response to the at least one arbitrated torque request signal and the at least one torque reservation request signal indicating that the vehicle is in the anticipated vehicle dynamic state,
wherein the first and second predetermined response times are different from one another.

* * * * *